Patented June 24, 1930

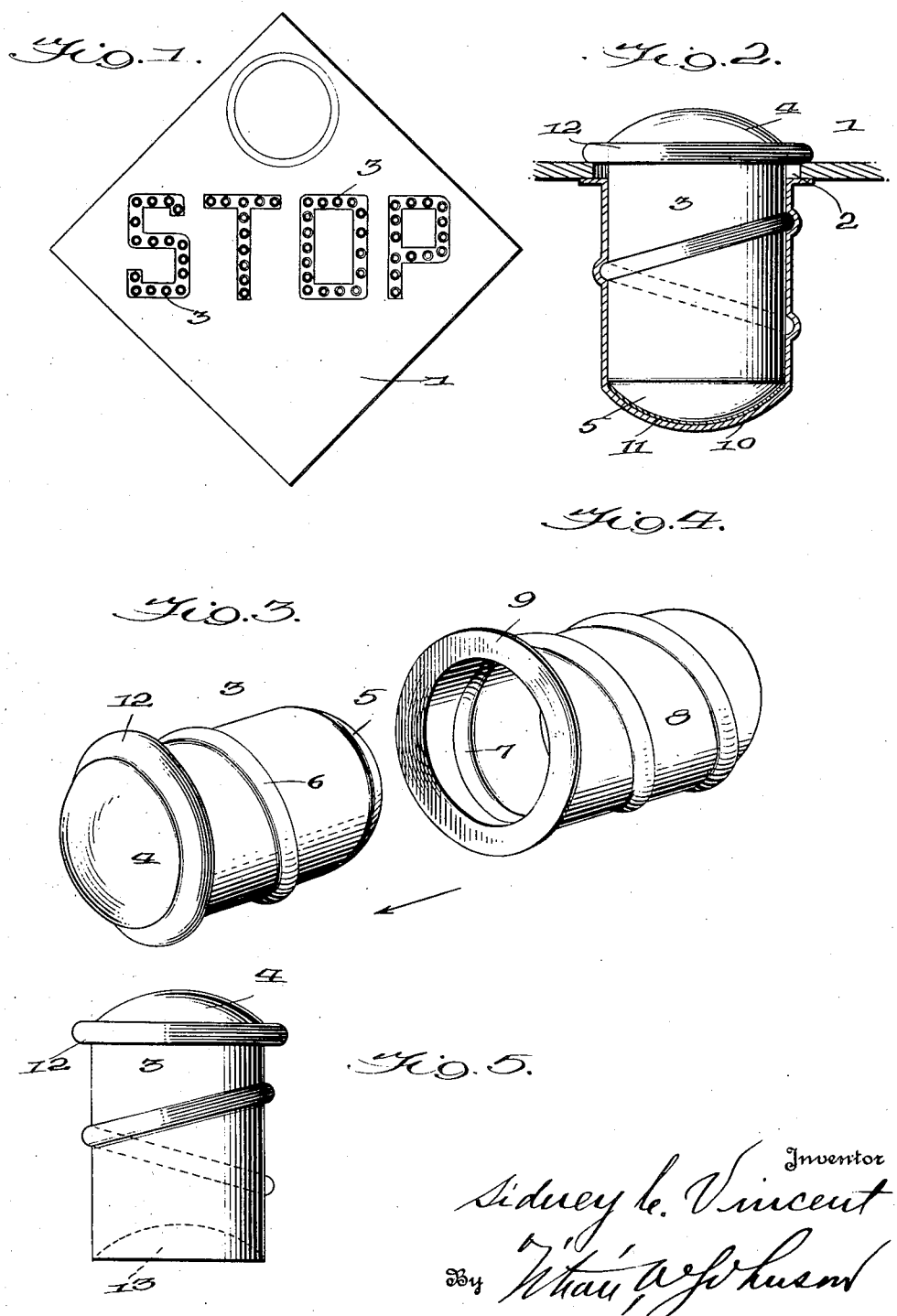

1,767,160

UNITED STATES PATENT OFFICE

SIDNEY C. VINCENT, OF BALTIMORE, MARYLAND

LIGHT-REFLECTING UNIT AND MEANS FOR SUPPORTING THE SAME

Application filed May 28, 1929. Serial No. 366,713.

This invention relates to improvements in reflecting device units and means for securing the unit to its support.

The invention belongs to that class of reflectors used in signs wherein the units reflect the light projected upon them from the lamps of approaching vehicles, such as automobiles, or from other sources. The units may be used singly or in multiple arrangement and when used in multiple arrangement, they may constitute the outlines of letters, figures, or designs, as fancy may dictate, or as the exigencies of use may require.

I am aware that it is old to provide light reflecting units comprising lenses of various forms, such plano-convex lenses, with reflectors behind them, but my invention contemplates, as intimated, a simple structure whereby a lens is provided with a convex outer end and with an inner end that may be variously formed as will appear, in combination with a reflector, the part of the device which forms the reflector being also adapted to serve as a means whereby the lens is firmly secured to its support.

Broadly stated, the invention comprises a substantially cylindrical lens preferably provided externally, with a thread, the outer portion of which is of greater diameter than the lens, in combination with a cap having a female thread on the inner periphery thereof, coacting with the thread on the lens whereby the lens is held in position upon its support.

While the invention in its preferred form contemplates the provision of a male circumferential thread on the lens and a female thread on the cap, cooperating with the thread on the lens, it is obvious that this arrangement may be reversed in that the female thread may be formed upon the lens and the male thread on the cap, care being taken in the formation of the female thread on the lens that it does not interfere with the reflecting possibilities of the lens.

In the drawings illustrating the invention,

Figure 1 illustrates a front view of a sign upon which the word "Stop" is outlined by a plurality of reflecting elements.

Figure 2 is a section of a portion of the sign plate showing reflecting elements secured thereto.

Figure 3 is a perspective view of the reflecting element.

Figure 4 is a perspective view of the cap which cooperates with the reflector element to secure the whole device in place upon its support; and Figure 5 is a sectional view of a modified form of reflecting element.

In this art, these individual reflecting elements have become known and are frequently referred to, as reflecting buttons or reflector buttons, and as intimated, the primary object of this invention is to provide a reflector element or button that will have high reflective powers and one which will be of very simple construction and embody in its construction, characteristics enabling the device to be readily assembled upon its plate or support, in such a way that the individual buttons may be removed with comparative ease should one or more be broken, or where different color combinations may be required, without destruction of the entire sign.

Referring to the drawings, the numeral 1 designates a plate of metal or other suitable material which forms a support for the reflecting device, and in which a circular opening 2 is provided, through which the lens is inserted from the front of the plate in assembling the parts. The numeral 3 designates the lens or reflecting element. This is provided with an outer convex end 4 and an inner convex end 5. The lens, which is of glass, is provided externally with a male thread 6 adapted to be received in a female thread 7 of a cap 8 provided at its forward end with an annular flange 9, preferably normally slightly flared and adapted to contact with the inner side of the plate 1, when the reflector unit is in place in the plate. The inner end of the cap is convexed as indicated at 10, and is provided with a reflector surface 11, which when the cap and lens are drawn together, is brought against the convexed inner end of the lens, as shown in Figure 2.

The outer end of the lens is provided with an annular flange or abutment 12, which abuts against the outer face of the plate opposite the annular flange 9 of the cap, with the plate or support between said abutment and flange, so that when the cap is screwed on to the lens, the lens will be held firmly on the plate.

It will be understood that the threads, both on the lens and in the cap, are shallow and that the opening in the plate 1 will be of sufficient size to permit the reflector element to be inserted through the front of the plate, and the abutment 12 will be sufficiently greater in diameter than the main body of the lens, as to present a flat surface to the face of the plate adjacent the opening.

Preferably I provide between the annular flange 9 and the inner surface of the plate against which the flange abuts, or upon the threads, or both, a substance such as shellac or cement, which is adapted to set or harden, but which may be readily dissolved or broken away or dislodged when it is the intention to do so as may be the case when it is desired to replace a broken or damaged lens or "button."

In the form shown in Figure 5, the inner end of the lens, instead of being convex, is concaved as indicated at 13, relative to the cap, otherwise the construction is identical with that shown in the main figures.

I claim:

1. A reflecting device including a lens having a threaded body portion and a support-engaging means, a threaded cap having support-engaging means and adapted to envelop said body portion and coact with the threads on said body portion, the cap and lens being adapted to be moved relative to each other, whereby the cap and lens may be secured to a suitable support.

2. A reflecting device including a cylindrical lens having a threaded body portion and a support-engaging means, a hollow cylindrical cap having support-engaging means and having a thread therein corresponding with the thread on the lens, the cap and lens being adapted to be threaded together to support the device upon a suitable plate or support.

3. A reflecting device including a plate having an opening therethrough, a lens occupying said opening, an abutment adjacent the forward end of the lens adapted to engage the front face of the plate adjacent the opening, a cap having a plate-engaging means and adapted to envelop the rear end of the lens, a thread on the body of the lens and a corresponding thread in the cap, whereby the cap and lens are secured to the plate, and a reflector in the inner end of the cap.

4. A reflecting device including a lens having a convexed outer end and a convexed inner end, an abutment adjacent the outer end, a thread on the body of the lens, a cap having a plate-engaging means and adapted to envelop the inner portion of the lens and provided with a thread corresponding to the thread on the lens, a plate interposed between the cap and abutment on the lens, the lens and cap being adapted to be moved toward each other to clamp the device to the plate, and a reflector in the bottom of the cap.

5. A sign comprising a suitable plate having a plurality of perforations therein, a plurality of lenses, one in each perforation, each lens being provided with an abutment near its forward end adapted to engage the front face of the plate, and each lens being provided with a cap having plate-engaging means and enveloping the lens and provided with a thread, a thread carried by each lens and cooperating with the thread in the cap whereby, when the cap and lens are threaded together, the device is clamped to the plate.

6. A sign comprising a suitable plate having a plurality of perforations therein, a plurality of lenses, one for each perforation, each lens being provided with plate-engaging means and carrying a thread, and each lens being provided with a cap having a plate-engaging means and having a thread adapted to cooperate with the thread on the lens, the cap and lens being adapted to be moved relative to each other, whereby when the cap and lens are threaded together, the device is clamped to the plate.

7. A sign comprising a suitable plate having a plurality of perforations therein, a plurality of lenses, each having plate-engaging means, one for each perforation, each lens carrying a thread, and each lens being provided with a cap having plate engaging means and also having a thread adapted to cooperate with the thread on the lens, the cap and lens being adapted to be moved relative to each other, whereby when the cap and lens are threaded together, the device is clamped to the plate, and a reflector surface in each cap at the rear of the lens.

In testimony whereof I affix my signature.

SIDNEY C. VINCENT.